March 24, 1942.   R. C. TOWNSEND   2,277,616
STRUCTURAL BEAM
Filed July 31, 1941
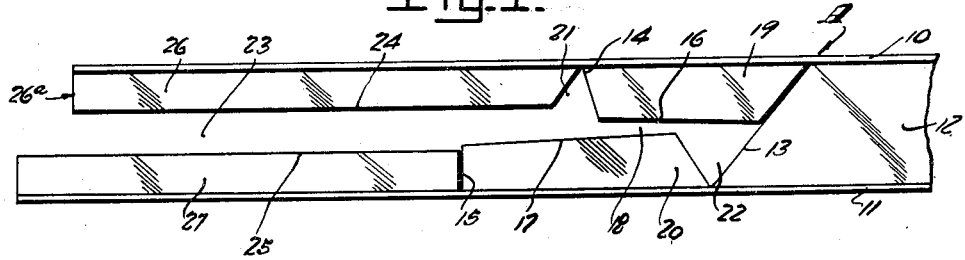
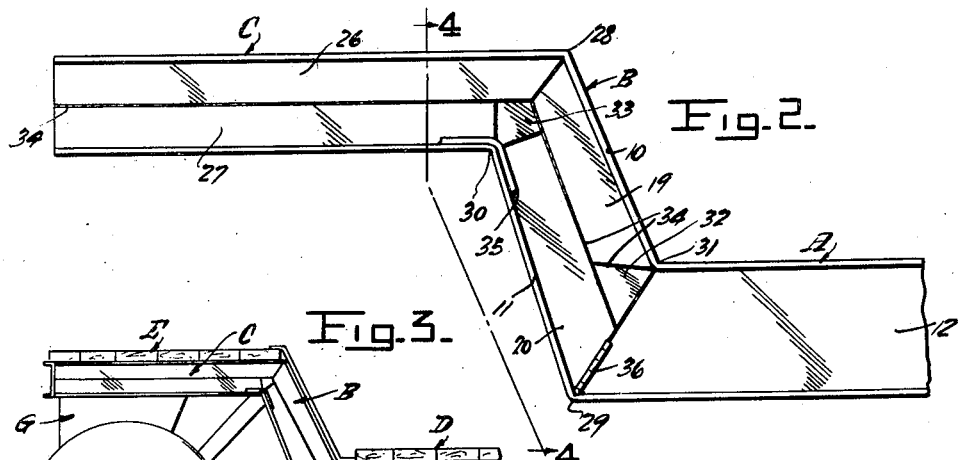
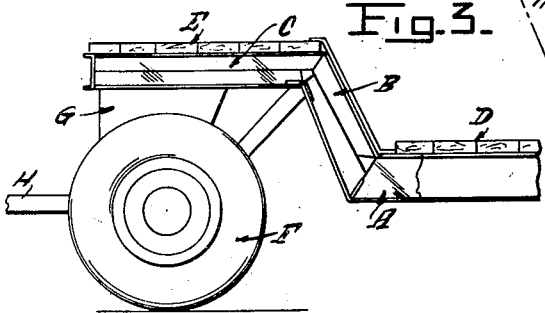
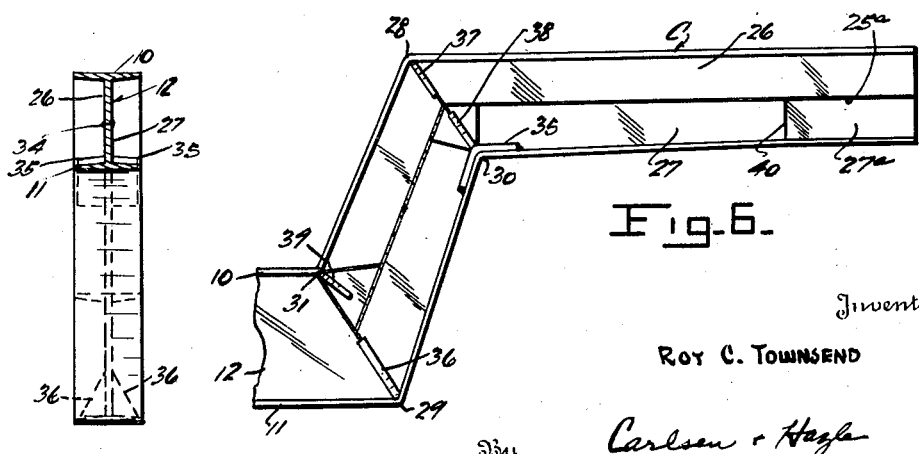
Inventor
Roy C. Townsend
Carlsen + Hagle
Attorneys Patented Mar. 24, 1942

2,277,616

UNITED STATES PATENT OFFICE 2,277,616

STRUCTURAL BEAM

Roy C. Townsend, La Crosse, Wis.

Application July 31, 1941, Serial No. 404,746

2 Claims. (Cl. 189—37)

This invention relates to improvements in structural beams of the types used in the fabrication of structures for carrying heavy loads, such as heavy duty trailers and light vehicles.

In the construction of such vehicles, it is desirable from the standpoint of comparative lightness and cheapness to use as the main supporting members a number of rolled section beams of the I-beam and H-beam type rather than to employ castings or other methods of manufacturing. However, it is also necessary to provide great strength on the beams in the particular types of vehicles here in mind. The attainment of these desirable features is complicated by the necessity of forming upwardly offset bends or goosenecks at the forward ends of at least a part of said supporting members. Inasmuch as rolled section beams of the type employed are specifically designed to resist bending stresses, it is apparent that formation of these bends without a great sacrifice in strength is extremely difficult, and for this reason it has hitherto been the custom to employ heavy steel castings.

With the foregoing facts in mind, it is the primary object of my invention to provide a beam suitable for the uses specified and having the offset or gooseneck end so bent and formed that the original strength of the beam will not be impaired. Another object is to provide a beam of this nature in which the bent end is tapered or reduced in its vertical width in order to reduce the height of the platform supported thereon while providing adequate space therebeneath for the supporting wheel truck.

These and other more detailed and specific objects will be disclosed in the course of the following specification, reference being had to the accompanying drawing, in which—

Fig. 1 is a side elevation of the end portion of a typical structural beam as employed in the fabrication of trailer vehicles and showing the web connecting the respective upper and lower flanges as cut and prepared for forming the offset or gooseneck bend in accordance with my invention.

Fig. 2 is a side elevation of the beam with the bend completely formed and with the previously cut and notched portions of the web reunited by welding and with certain bracing and filling elements secured to the web.

Fig. 3 is a side elevation or a reduced scale of the forward end of a trailer showing the use of the beam as constructed in accordance with my invention.

Fig. 4 is a vertical cross section along the line 4—4 in Fig. 2.

Fig. 5 is a composite perspective view of the patch plates which are welded in the openings formed in the web as the beam is bent.

Fig. 6 is a view similar to Fig. 2 but looking at the opposite side of a bent beam and showing a slightly modified construction.

This application is a continuation-in-part from my copending application for patent on Structural beam and method of making the same, filed September 25, 1939, and given Serial No. 296,407.

Referring now with more particularity to the drawing, the reference character A designates generally an end portion of a rolled section I-beam or H-beam of a well known type having upper and lower flanges 10 and 11 joined by an upright connecting web 12. Obviously, however, my invention may be employed in connection with any type of beam having spaced flanges and a connecting web, as will be understood.

In accordance with the invention, the beam is to be provided with an offset reversed bend or connecting portion B in such manner that a relatively short end portion C will be extended substantially parallel to the axis of the beam, but spaced thereabove, thus forming what is generally known as a gooseneck or "kickup" in trailer practice.

To prepare the beam for bending an angular cut 13 is first made entirely across the web 12 diagonally between upper and lower flanges 10 and 11 at the point where the bend is to be started. and formed in spaced relation to this cut 13, outwardly in the direction of the end of the beam, are additional cuts 14 and 15 which are extended to the flanges 10 and 11 respectively and are spaced at relatively different distances from cut 13 as clearly shown. These cuts 14 and 15 are joined to cut 13 by angularly and generally longitudinally extending cuts along lines 16 and 17 which are spaced apart to thereby remove a substantial portion 18 from the web. The freed upper and lower web sections 19 and 20 thus formed, taper or diminish in width in the vertical plane and in the direction away from cut 13.

Notches or openings 21 and 22 are formed at the cut 14 and at the junction of cut 13 and line 17 to permit adjacent portions of the web to move together as the web is formed and as hereinafter will appear. From the cuts 14 and 15 outwardly to the end of the beam, a medial strip or portion of the web 12 is removed, as designated at 23, by substantially parallel cuts extended along the lines 24 and 25, and the uppermost freed section 26 of the beam is cut shorter than the corresponding lower section 27, as represented at 26a. The distance between the cuts 14 and 13 is determined in accordance with the amount of offset desired in the beam and all other cuts and notches are of course formed to correspond. Likewise the amount of material removed from the center of the web 12 between the lines 16 and 17, and the lines 24 and 25, is selected according to the desired reduction in the width of the beam.

When the beam is thus prepared, it is reversely bent in the plane of the web 12 to the offset or gooseneck shape shown in Fig. 2 and the contiguous margins of the web sections 19 and 20 and sections 26 and 27 are brought together in this process thus resulting in a reduction in the width of the spacing between the respective flanges 10 and 11 by an amount determined, as aforesaid, by the width of the respective web sections. The cuts 13, 14 and 15 permit the flanges 10 and 11 to bend freely at the two opposed bends 28 and 29 and at the two reverse opposed bends 30 and 31, and in this process the notches or openings 21 and 22 are closed or brought together while the adjacent margins of the web at the cuts 13 and 15 are spread apart as shown. The openings formed by this spreading action are closed by the insertion therein of correspondingly shaped patch or filler plates 32 and 33.

When the bending is thus completed all of the various margins of the cut sections of the web 12, and of the plates 32 and 33, are reunited and rigidly connected by welding or brazing along the lines or seams designated generally at 34, thus restoring the web to its original strength. Additional strength is provided by the welding of brace angles or plates 35 to the lower flange 11 over and around the lower bend 30 and by welding triangular plates 36 to the flange 11 and adjacent portion of the web 12 at the bend 29, the latter plates 36 being disposed over the seam provided as the opening 22 is closed in the bending of the beam.

As the bending operation takes place the lower section 27 of the web is drawn back beneath the upper section 26 so that the ends fall into alignment as clearly shown in Fig. 2.

Referring to Fig. 3 the forward end of a trailer constructed with the use of beams prepared by this invention is shown and two or more of such beams are extended longitudinally with the bends B forwardly disposed. A main deck or platform D is laid on the lower portion of the beams B and a narrower upper platform or deck E is laid on the upper offset end C. There is thus formed what is known in the art as the "kickup" or gooseneck below which may be mounted the dirigible foretruck F connected by a fifth-wheel mechanism G and steerable by the forwardly extending tongue H.

As heretofore stated, it is imperative that there be sufficient headroom beneath the ends of the beams to provide clearance for the truck F but at the same time it is desirable to reduce as much as possible the overall height of the front deck E in order not to interfere with the load carried by the trailer. This the present invention accomplishes to the greatest practicable extent by reducing the width of the beam end C in the vertical plane, by the amount of the web section removed at 23, and correspondingly lowering the upper flange 10. This reduction in the width in most cases will not interfere with the effectiveness of the structure, since the full strength of the beam is not required at this point as it is through the length of the trailer rearwardly of the truck F. Obviously as the cuts 16 and 17 are angularly formed, the bent portion B of the beam tapers upwardly thus providing the greatest strength at its lower end where it is required at the junction with the main portion of the beam A.

It has been found that in some cases, additional bracing is desirable at the bends 28, 29, 30 and 31, and as shown in Fig. 6 I may, in addition to the bracing plates 35 and 36, employ additional triangular braces 37, 38 and 39 welded to the flanges at the bends 28, 30 and 31 and to adjacent portions of the web 12. The additional bracing thus provided is found to overcome any tendency towards web fracture at these points. It may also be desirable to taper the bent end C of the beam in a forward direction with the greater width (in the vertical plane) placed near its rear end and for this purpose the lower web section 27 may be correspondingly tapered by forming the cut 25 angularly with respect to the lower flange 11 as will be clearly evident. In order then to dispose the lower flange in a horizontal plane where it is supported upon the truck an additional vertical cut 40 will be formed through the web section 26 at some distance from the end of the beam, thus freeing the end portion 27a of the web and the cut line 25a forming the margin of this portion 27a will be parallel with the flange. The cut 40 is of course, welded together after the beam is bent.

It is understood that suitable modifications may be made in the structure as disclosed, provided such modifications come within the spirit and scope of the appended claims. Having now therefore fully illustrated and described my invention, what I claim to be new desire to protect by Letters Patent is:

1. A structural beam having spaced flanges joined by a web and having a reversely bent portion connecting an offset end portion formed by cutting the web between the flanges to permit said flanges to be bent at spaced points in the plane of the web, and brace plates welded to one flange and the web at the junction of said offset end portion and reversely bent portion of the beam.

2. A structural beam having spaced flanges joined by a web and having its flanges reversely bent to provide a connecting portion uniting offset portions, the said web being cut between the flanges at the points at which they are bent and being then reunited by welded seams when the beam is bent, and bracing plates welded over certain of said seams and to adjacent flange portions.

ROY C. TOWNSEND.